United States Patent [19]
van Oostrom et al.

[11] Patent Number: 5,826,317
[45] Date of Patent: Oct. 27, 1998

[54] SYSTEM FOR MANUFACTURING BLINDS

[75] Inventors: Peter van Oostrom, Tiel; Carl A. Knikkenberg, Bruinisse; John Peter Prins, Nieuw Vossemeer; Adri Steffen, Oud Vossemer, all of Netherlands; Reine Larsson, Hjälteby, Sweden; Peter Berntsson, Varekil, Sweden; Peter Gawell, Jörlanda, Sweden

[73] Assignee: Hunter Douglas International N.V., Netherlands Antilles

[21] Appl. No.: 764,358

[22] Filed: Dec. 12, 1996

[30] Foreign Application Priority Data

Dec. 14, 1995 [EP] European Pat. Off. .............. 95203476

[51] Int. Cl.⁶ ..................................................... B23P 19/04
[52] U.S. Cl. ................................ 29/24.5; 29/703; 29/711; 29/783; 29/791
[58] Field of Search ........................... 29/24.5, 241, 702, 29/703, 711, 712, 714, 720, 783, 791, 822

[56] References Cited

U.S. PATENT DOCUMENTS

| | | |
|---|---|---|
| 2,489,467 | 11/1949 | Sherwood . |
| 2,706,330 | 4/1955 | Nelson . |
| 3,043,178 | 7/1962 | Lorentzen . |
| 3,498,167 | 3/1970 | Hill . |
| 4,073,044 | 2/1978 | Edixhoven . |
| 4,145,797 | 3/1979 | Walsh . |
| 4,730,372 | 3/1988 | Tsuchida ................................... 29/24.5 |
| 5,022,296 | 6/1991 | Eschauzier et al. . |
| 5,233,533 | 8/1993 | Edstrom et al. . |
| 5,349,730 | 9/1994 | Anderson et al. . |

FOREIGN PATENT DOCUMENTS

| | | |
|---|---|---|
| 2274521 | 7/1994 | United Kingdom . |
| 9525656 | 9/1995 | WIPO . |

*Primary Examiner*—David P. Bryant
*Attorney, Agent, or Firm*—Dorsey & Whitney LLP

[57] ABSTRACT

A system for manufacturing blinds comprises a processor unit, at least one manufacturing facility for carrying out a manufacturing step and a communication device for exchanging data between the processor unit and said at least one manufacturing facility. To arrange for efficient and economical manufacturing, whereby manufacturing time and scrap are relatively low, the processor unit is adapted to generate data for controlling the system taking into account an order portfolio and at least one parameter from said at least one manufacturing facility.

46 Claims, 7 Drawing Sheets

SYSTEM FOR MANUFACTURING BLINDS

The invention underlying the present disclosure relates to a system for manufacturing blinds, said system comprising a processor unit, at least one manufacturing facility for carrying out a manufacturing step and a communication device for exchanging data between the processor unit and said at least one manufacturing facility.

Such a system for manufacturing blinds is known inter alia from United States patent document U.S. Pat. No. 3,498,167. In the system of the document mentioned, the processor unit is embodied by a control unit that is installed on a punch and shearing facility. The control unit controls the manufacturing facility in response to a program on a tape, whereby the control unit provides instructions to and receives information of parts of the manufacturing facility.

The invention has as an object to provide a system for manufacturing blinds, which system efficiently and economically achieves manufacturing, whereby manufacturing time and scrap are relatively low.

A system for manufacturing blinds in accordance with the invention is characterized in that the processor unit is adapted to generate data for controlling the system taking into account an order portfolio and at least one parameter from said at least one manufacturing facility. The invention is based on the view that control of the system after having regarded the order portfolio and at least one parameter from the manufacturing facility results in time and scrap reduced manufacturing. For example, when said parameter relates to a certain finish (e.g. color) of blind material, taking into account the order portfolio provides basis for a manufacturing sequence of blinds of the same finish. When said parameter would relate to a standard length of raw material, taking into account the order portfolio provides basis for a manufacturing sequence using the standard length most economically. Said manufacturing facility may be, for example, a rail machine whereby the manufacturing step may he cutting to length a longitudinal material, or a slat manufacturing and assembling machine whereby the manufacturing step will be self-explanatory.

Above-mentioned and other (more detailed) aspects of the invention are further described and illustrated with reference to the accompanying drawings, wherein FIG. 1 shows an embodiment of a general layout for a system for manufacturing blinds in accordance with the invention;

In the figures similar reference signs refer to corresponding parts of the system for manufacturing blinds.

Figure 1:
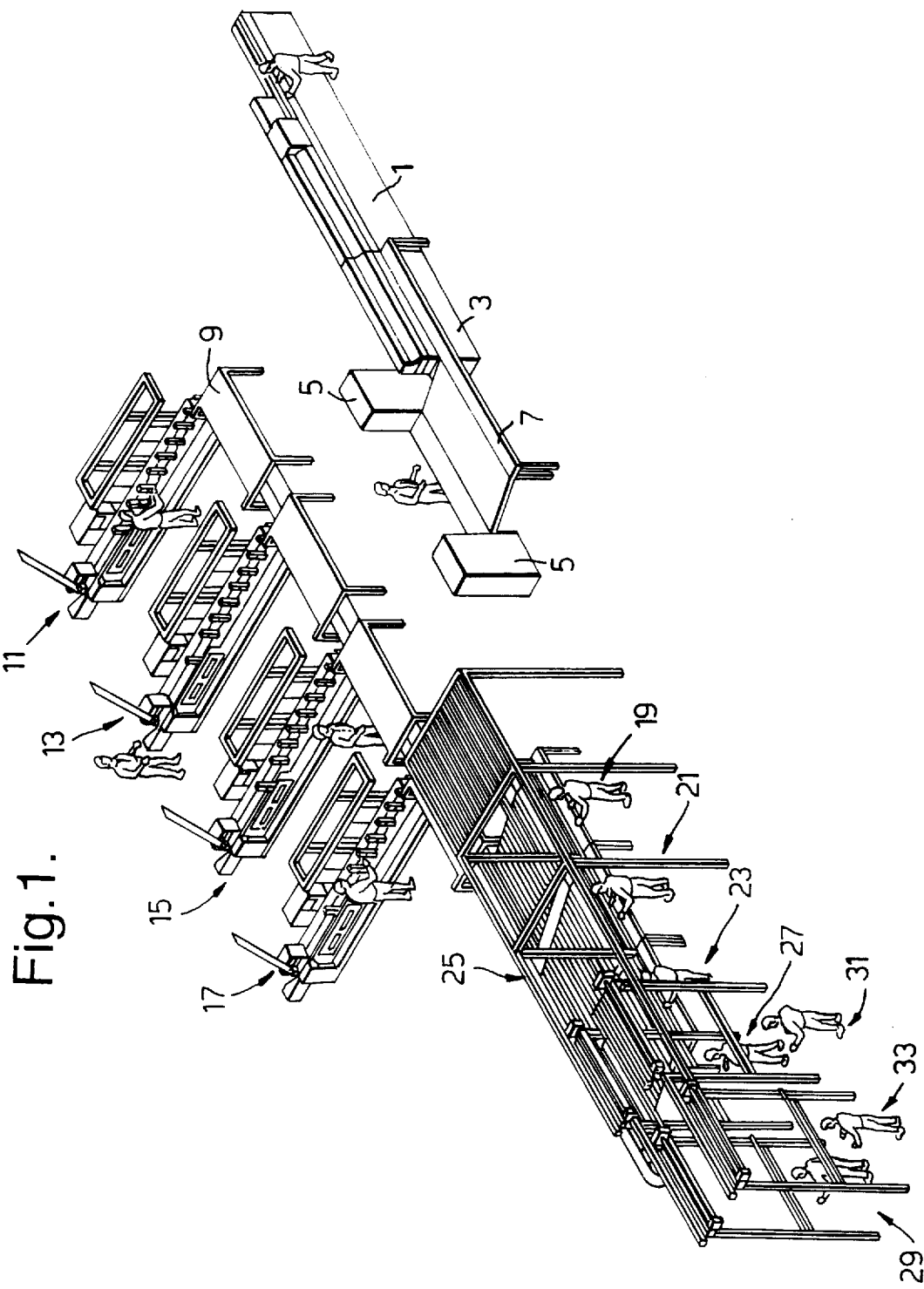

FIG. 1 shows an embodiment of a general layout for a system for manufacturing blinds in accordance with the invention. Shown is a rail machine 1 for cutting to length elongate commercial lengths of sheet metal profiles for use in blinds. Such profiles are used for head and bottom rails and are usually prepared simultaneously by the rail machine. It is also common for such rail machine to cut to length longitudinal tilt shafts and to perform punching operations in the head and bottom rail for these to cooperate with later to be fitted hardware components. For a detailed description of such rail machine, reference is made to United States patent document U.S. Pat. No. 3,043,178, the disclosure of which document is hereby incorporated by reference.

Within the present manufacturing environment it is advantageous for such rail machine to be numerically controlled. For a suitable type of numerical control reference is further made to United States patent document U.S. Pat. No. 3,498,167, the disclosure of which document is hereby incorporated by reference. Aligned with the rail machine 1 is a headrail fitting unit 3. The headrail fitting unit 3 inserts required hardware components into the headrail. A mechanical constitution of such head rail fitting unit is described in United States patent document U.S. Pat. No. 2,706,330, the disclosure of which document is hereby incorporated by reference. Preferably again the operation of such headrail fitting unit is numerically controlled and means to achieve this are well known from the art.

The sequence and mode of operation of the headrail fitting unit 3 can conceivably be determined and controlled either by a processor unit or by the rail machine which precedes it. One particularly advantageous means for determining and controlling the operation of the headrail fitting unit 3 for use with the present invention will be described hereinafter.

Further illustrated is a couple of string tape machines 5 which are positioned at either side of a receiving end of a conveyor 7, which conveyor is part of a transport facility. The conveyor 7 transports the headrail, which is semi-finished, the bottom rail and the tilt shaft for a single blind to the string tape machine 5. The elements which pertain to a single blind under construction are preferably placed in an individual container or tray.

Illustrated are two string tape machines 5, of which each may be adapted to a different type of string tape. If only one type of string tape is used or when the string tape machine can quickly change from one type to another type, then only one single string tape machine 5 will be required. A general construction of such a string tape machine is described in United States patent document U.S. Pat. No. 4,145,797, the disclosure of this document is hereby incorporated by reference. Then, after that a required number of pre-finished string tapes have been added to the headrail anal like parts of a blind under construction, all elements are put on further conveyor 9, which is also part of the transport facility. The further conveyor 9 communicates with any one of four slat manufacturing and assembling machines 11, 13, 15, and 17. Again the number at the slat machines 11, 13, 15, and 17 is facultative and may be in ratio of their production capacity compared to the rail machine 1 or to the headrail fitting unit 3. Also, different slat machines may be preset to manufacture and assemble only slat material of a particular shape or dimension different from the other machine or machines. A concept of such slat machines is amply described in United States patent document U.S. Pat. No. 4,073,044, the disclosure of which document is hereby incorporated by reference. Such slat machines may be further enhanced with automatic control as described in United States patent document U.S. Pat. No. 5,349,730 and in particular may be provided with an additional control feature such as described in United States patent document U.S. Pat. No. 5,022,296.

When a required number of slats has been manufactured and assembled in the string tapes (ladder cords), resulting in a bunch of slats, the raising and lowering cords are cut to length and put in position through aligned cord holes in the bunch of slats. Thereafter, all blind elements are conveyed to any one of a number of assembly tables 19, 21, 23 for a manual assembly of the bunch of slats to the headrail. In the present embodiment, following this operation the blind headrail is attached to a carrier in an overhead conveyor 25, which conveyor is part of the transport facility. The overhead conveyor is provided with a number of elongate carriers which can be transported longitudinally as well as transversely to their length.

A suitable overhead conveyor device is described in the international patent application document WO 95/25656, the disclosure of which document is hereby incorporated by reference. The overhead conveyor takes the partly finished blind to a first end assembly station 27 in which tape spacers, end caps and the bottom rail are inserted. Further finishing takes place at a second finishing station 29, where the string tapes and lift cords are attached to the bottom rail. In a third station 31, the blind operating elements such as a tassel and a tilt wand are attached. Then final inspection and detail finishing is accomplished in a fourth and last station 33 from which the finished blind is ready for dispatch.

The routing of the blinds through the four end assembly stations 27, 29, 31, and 33 is by alternate longitudinal and transverse movement of the carrier of the overhead conveyor. This allows for a minimal demand on floor space in an assembly plant. The four final assembly stations are generally identical in structure and allow the blind to be hung at an adjustable height. This enables the blinds to be fully deployed or with the blind raised sufficiently to lower the headrail within reach of an operating person to allow finishing. A detailed description of such an assembly station can be found in United States patent document U.S. Pat. No. 2,489,467, the disclosure of which document is hereby incorporated by reference.

Figure 2:
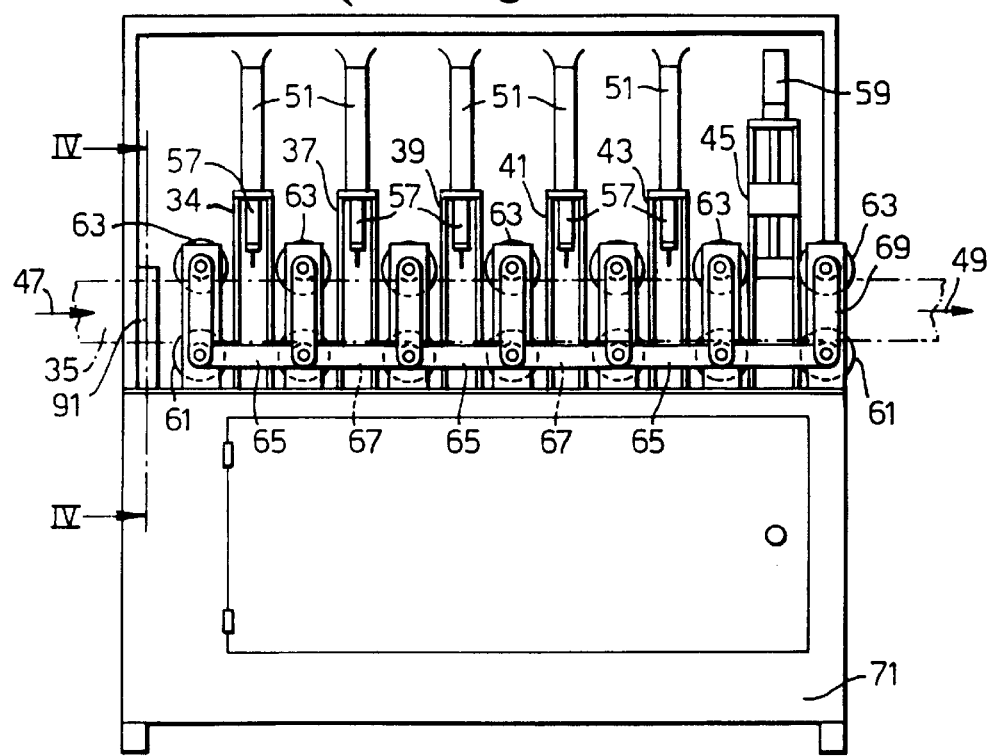
FIG. 2 shows a schematic embodiment of a headrail fitting unit for use in a system for manufacturing blinds in accordance with the invention.

FIG. 2 schematically shows an embodiment of a headrail fitting unit for use in a system for manufacturing blinds in accordance with the invention. The headrail fitting unit 3 is shown looking towards the stations effecting the insertion of hardware. A first inserting station 34 is adapted to insert a single tilter gearing in either a right hand or a left hand end of a headrail 35 shown in dash dotted lines. A second inserting station 37 is adapted to insert a single cord lock destined to be fitted in a left hand end of the headrail. A third inserting station 39 does the same with a cord lock destined to be fitted in a right hand end of the headrail. Two further inserting stations 41 and 43 are provided to deal with hardware combinations in which cord lock and tilter gearing are combined at either the left hand or the right hand end of a headrail. A final inserting station 45 deals with the tilt roll supports. This station differs somewhat from the other stations and operates several times and at least two times on each headrail; the previous stations are only to operate once per headrail. The in-feed direction of the headrail 35 is indicated by arrow 47 and the out-feed direction by arrow 49. The headrail 35 can be directly fed from the rail machine 1 and the machines 1 and 3 can be directly coupled together as shown in FIG. 1. Moreover the machine control for headrail positioning and tool station operation can be centralized into one unit. FIG. 2 further shows that each station is provided with a magazine 51 for holding a supply of hardware components.

Figure 3:
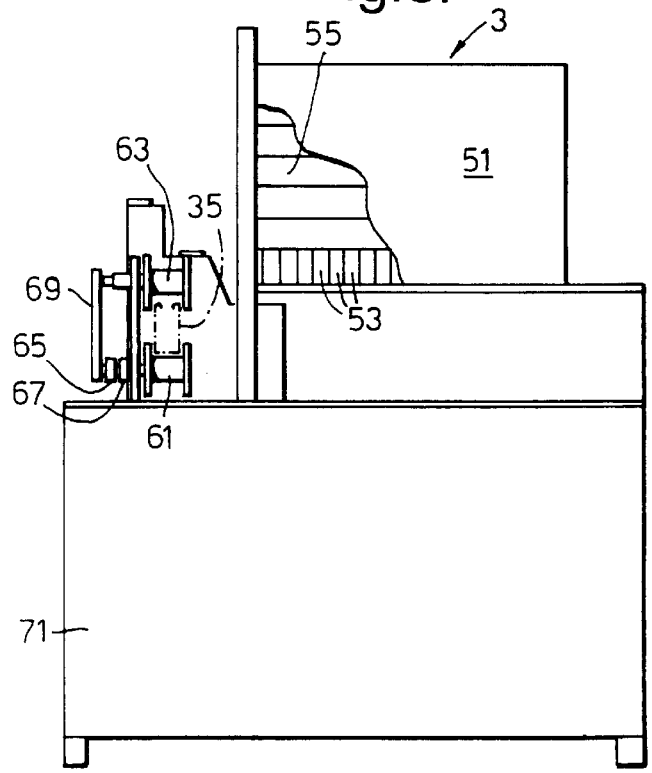
FIG. 3 shows schematically a side view of the embodiment of the headrail fitting station of FIG. 2.

FIG. 3 shows a schematic side view of one embodiment of the headrail fitting station of FIG. 2. Hardware components 53, which could be anything ranging from tilters to tilter cord lock combinations depending on the particular station mentioned above, are contained in tubular supply containers 55 as shown in the cut-out portion of magazine 51 in FIG. 3.

With reference to FIG. 2 it is further mentioned that each station is also provided with an actuator 57 or 59 which conveniently is in the form of a pneumatic cylinder positioned for a downward stroke. The headrail 35 is supported and positioned in the machine by a plurality of lower drive rollers 61 and upper drive rollers 63. All rollers 61 and 63 are driven through an array of horizontally positioned drive belts or chains 65 or 67 and vertically positioned drive belts 69. The position of the headrail in the fitting unit is controlled by an electronic eye, which preferably is positioned adjacent the in-feed end of the headrail fitting unit.

Figure 4:
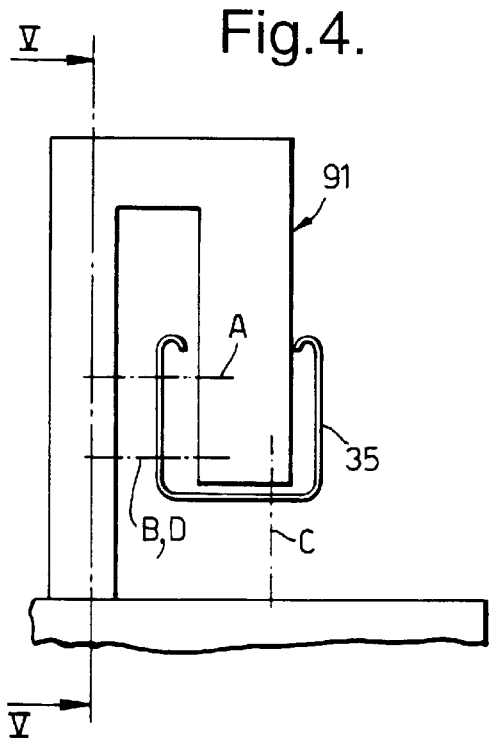
FIG. 4 shows a partial transverse section through the headrail fitting unit at the location of the measuring station according to the arrows IV—IV in FIG. 2.

FIGS. 2 and 4 show a measuring station 91 as used in the headrail fitting unit, which measuring station comprises a number of electronic eye type sensors. The measuring station 91 is provided with sensors A, B, C, and D, which each has a predefined position transverse of the headrail 35 as indicated by respective dashdotted center lines in FIG. 4.

Figure 5A:
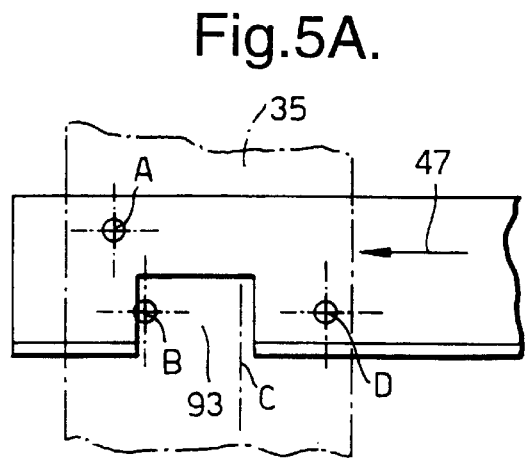
FIG. 5A shows schematically a first position of a headrail with respect to the sensors of the measuring station according to the arrows V—V in FIG. 4.

FIG. 5A shows a schematic side elevation through the measuring station of FIG. 4 in the direction of the arrows V—V and serves to illustrate the longitudinal position of sensors A, B, C, and D with respect to the headrail 35. As shown in FIG. 5A, the leading end, which is also the left hand end of the headrail 35, is fed in the direction of arrow 47 and is provided with an aperture 93 for receiving either a tilter gearing or a left hand cord lock. The headrail in FIG. 5A is shown in the position where sensor A has detected the presence of a headrail and where sensor B is in the process of detecting the aperture 93. The sensor C, which in FIGS. 4 through 5C is only indicated by its center line, is positioned to detect a bottom opening in the headrail for the passing of ladder cords and lift cords and thereby detects the positions for inserting the tilt roll supports. Such bottom openings are well understood by the man skilled in the art and do not need any further description. It is, however, important to note that sensor C is positioned remote from any tilter or cord lock openings such as 93 so as to detect only bottom openings in the headrail.

Figure 5B:
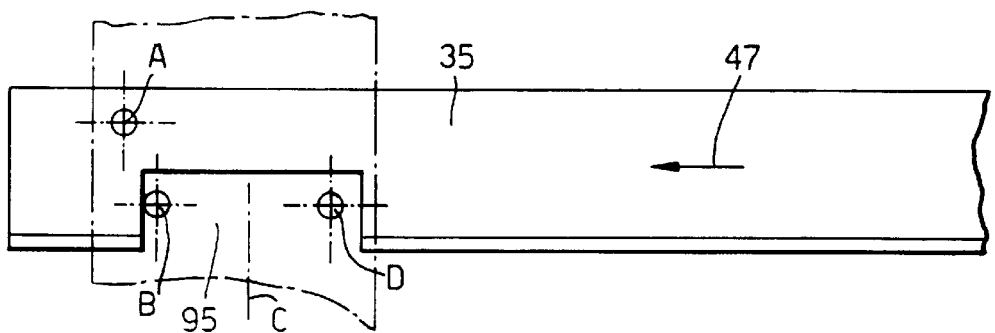
FIG. 5B shows schematically in a similar view as FIG. 5A a second position of a headrail with respect to the sensors of the measuring station.
Figure 5C:
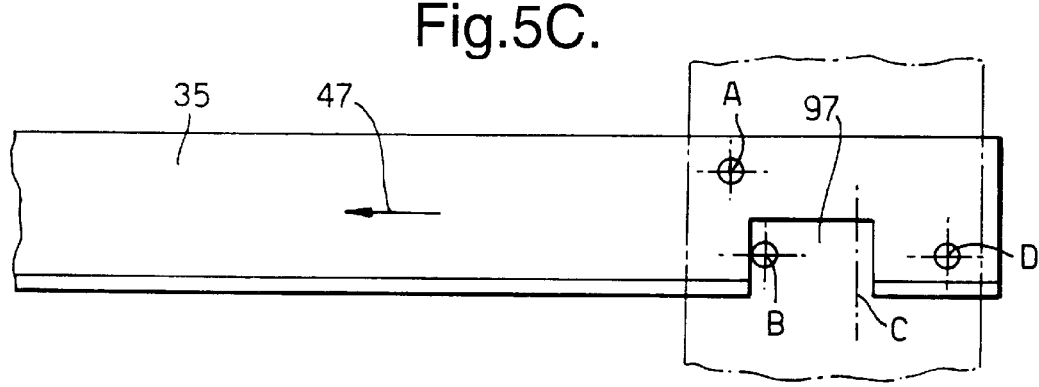
FIG. 5C shows schematically in a similar view as FIG. 5A a third position of a headrail with respect to the sensors of the measuring station.

FIG. 5B shows a left hand leading end of another form of headrail 35, which has a larger opening 95 for the insertion of a combined left hand cord lock and tilter gearing. With such a headrail, all the blind controls will be on the left hand side and the right hand end of such a headrail will not have any control openings. Alternatively a combined right hand cord lock and tilter if specified results in a plain leading left hand end and an enlarged opening such as 95 in the trailing right hand end of a headrail. Shown in FIG. 5B is the detection by sensor B of the larger opening for the combined blind operating controls.

FIG. 5C shows the trailing end of the headrail of FIG. 5A in front of the sensors A, B, and D. It may further be seen from FIG. 5C that sensor A, which detects the presence of headrail 35, is the last sensor to be uncovered upon continued movement of the headrail in the direction of arrow 47.

Hence the sensor C might misinterpret the end of the headrail for another bottom opening. The machine control hereinafter described will effectively avoid any such misinterpretations.

Figure 6:
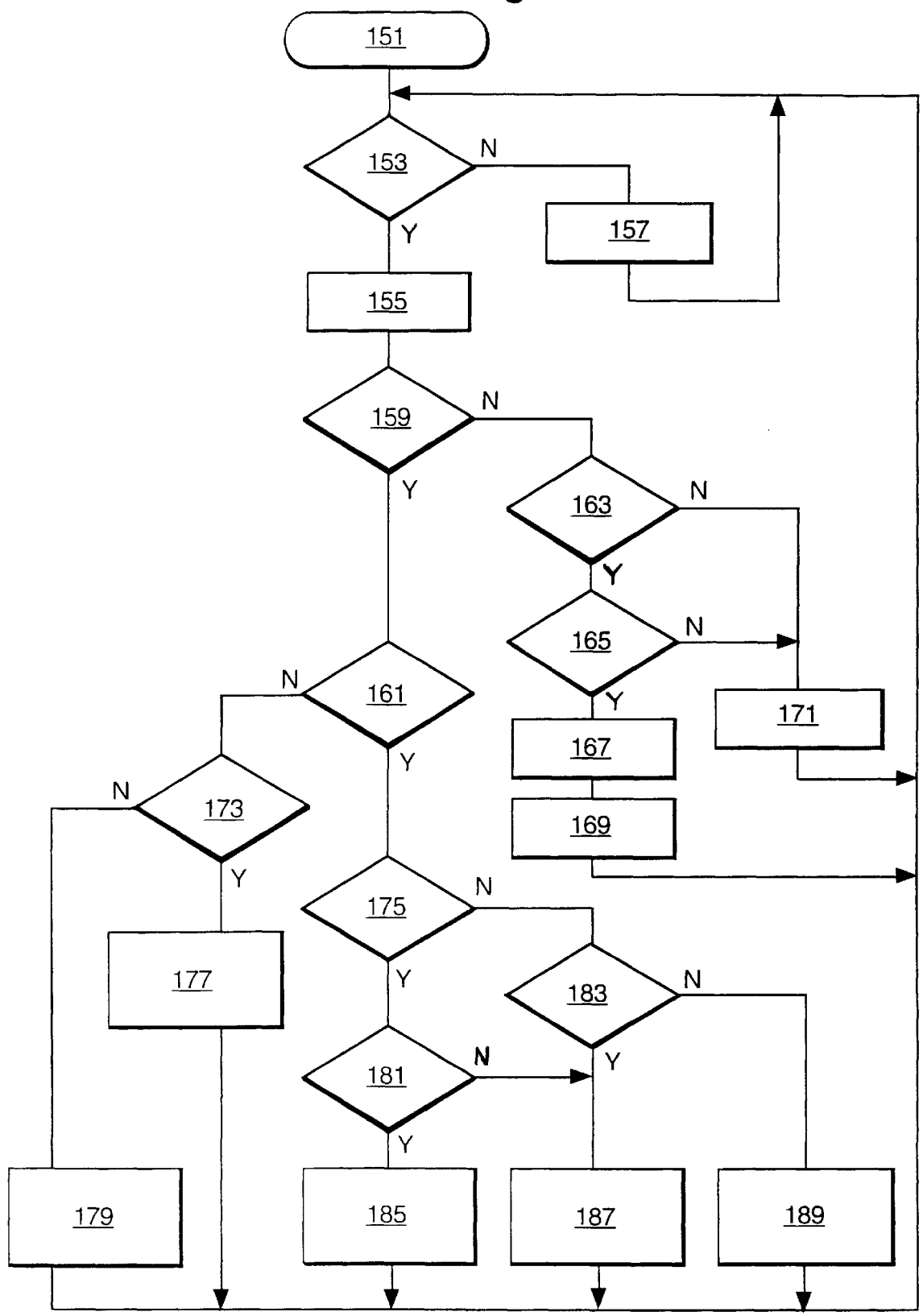
FIG. 6 shows an example of a flow chart for the control of the headrail fitting unit of FIGS. 2 through 5C.

FIG. 6 shows an example of a flow chart for the control of the headrail fitting unit of FIGS. 2 through 5C. A flow chart legend at the is given in Table 1 at the end at the description. At step 151 the headrail fitting unit is started. The fitting unit may be in the start position before being switched on and this may also be the case after finishing a previous run or subsequent to interruption in a previous task as a result of malfunction. At this stage several counters, which record the advance of the headrail through the fitting unit or the sequence of operations, will have been reset. At step 153 the unit through sensor A will determine whether there is a headrail present. If no headrail is present or if a headrail has ceased to be in detectable position, then a feed counter which continuously records the length of headrail passing through the fitting unit is reset to zero. As soon as a headrail is detected at step 153 the headrail feed counter is started at step 155 and is maintained active as long as the signal from sensor A does not change. At step 159 it is determined whether sensor B detects a control opening in the headrail for the insertion of a cord lock and/or a tilter. Subject to the requirements of the control circuit, the signal from sensor B may be inverted. If step 159 has detected a control opening in the headrail, then step 161 determines whether sensor D has detected a large or a small control opening.

The process, however, proceeds to step 163 if no control opening is detected in step 159. In step 163 it is determined whether sensor C detects a bottom rail opening. For the same reason as sensor B, sensor C may be arranged to give an inverted signal. If no bottom rail opening is detected, then the support counter is reset to zero and the process returns to step 153. Step 163 is passed before or after detection of a control opening for as long as step 153 detects the presence of a headrail.

If step 163 has detected a bottom rail opening, step 165 checks whether this is not a misinterpretation of the trailing end of the headrail by reading sensor D. As mentioned hereinabove, in case of left hand combined tilt and lift control the trailing end of the headrail has no control opening to enable the detection of the trailing headrail end. The check of step 165 may alternatively be replaced by a suitable input value which determines either the length of the particular headrail or the total number of supports to be inserted.

In the presently described control, as many as possible parameters are detected from the headrail proper so as to reduce as much as possible discrepancies between input and actual product resulting in error signals and machine interruptions.

If the bottom opening detected by step 163 is found to be valid by step 165, then the process counts a first support at step 167 and subsequently calculates and sets the feed counter value at which the support inserting station 45 will operate for a first time. After step 169, the process returns to step 153 and steps 167 and 169 are passed a subsequent number of times corresponding to the number of supports of the headrail. Each blind headrail will at least have two such supports and may have up to any number in excess thereof depending on the length of the headrail. As there is usually a practical limit to the length of the headrail, the number of supports will usually not exceed five. As soon as step 165 detects an end of headrail situation, the process is deflected to step 171 to reset the support counter and to return to step 153. If in step 159 the sensor B has detected a control opening, the sensor D in step 161 may detect a large control opening for a combined tilter and cord lock. If the control opening is determined by step 161 to be a large one, step 173 determines whether the opening has been detected in the left hand or right hand end of the headrail.

The step 173 may compare the current headrail feed counter value against a predefined threshold value. Alternatively, input may also be obtained from the rail-cutting machine 1 from a central database, or from a bar-code label.

If step 173 has determined a left hand control opening, then step 177 calculates and sets the headrail feed counter value at which to operate the inserting station 41 for the combined left hand tilter and cord lock. Otherwise, if step 173 has determined a right hand combined control opening, then step 179 calculates and sets the feed counter value at which to operate inserting station 43 for the combined right hand tilter and cord lock.

At step 161, the remaining possibility is that a small control opening is detected for the insertion of either a single tilter unit or a single cord lock unit. In that case the process proceeds to step 175, which determines whether a left hand cord lock has been specified. In the present embodiment it is preferred to use identical control openings for either a tilter, a left hand cord lock, or a right hand cord lock. This reduces the requirement of punch tools in the headrail cutting and punching machine 1 and also results in a more balanced appearance of the blind headrail. The downside of such an arrangement is that the headrail fitting unit cannot recognize whether a cord lock or a tilter is intended in the first detected single control opening 93. In the present example, the information as to whether a left hand cord lock is specified is received as input from either the previous rail cutting and punching machine 1 or from the common processor unit.

If a left hand cord lock is found to be specified at step 175, then step 181 analyzes whether the control opening 93 or 97 was detected at the left hand or right hand side of the headrail 35. Step 181 compares the feed counter reading to the predefined threshold value. If at step 175 it is determined that the cord lock for the single opening should be a right hand one, then step 183 determines whether the tilter or the right hand cord lock opening is detected. If the threshold comparison at step 181 determines that although a left hand tilter is specified it has detected a right hand opening, the process proceeds to step 187. Step 187 calculates and sets the headrail feed counter value at which the single tilter inserting station 34 is to be operated. Similarly, if step 183 has determined that a left hand opening has been detected in a headrail for a right hand cord lock, the process also proceeds to step 187. For the insertion of a left hand cord lock, step 181 proceeds to step 185, which calculates and sets the feed counter value at which to operate the left hand cord lock inserting station 37.

For the insertion of a right hand cord lock, step 183 proceeds to step 189, which calculates and sets the feed counter value at which to operate the right hand cord lock inserting station 39. After setting the values at either step 177, step 179, step 185, step 187, or step 189, the fitting unit control returns to step 153.

Additional control for the actuation of the inserting stations and the supply of magazines 51 may be of any conventional type. The operation of the inserting stations may further involve conventional pneumatic and electric components.

A majority of the electrical and pneumatic components for the machine operation can be suitably housed in a cabinet 71 in the base of the headrail fitting unit 3.

Figure 7:
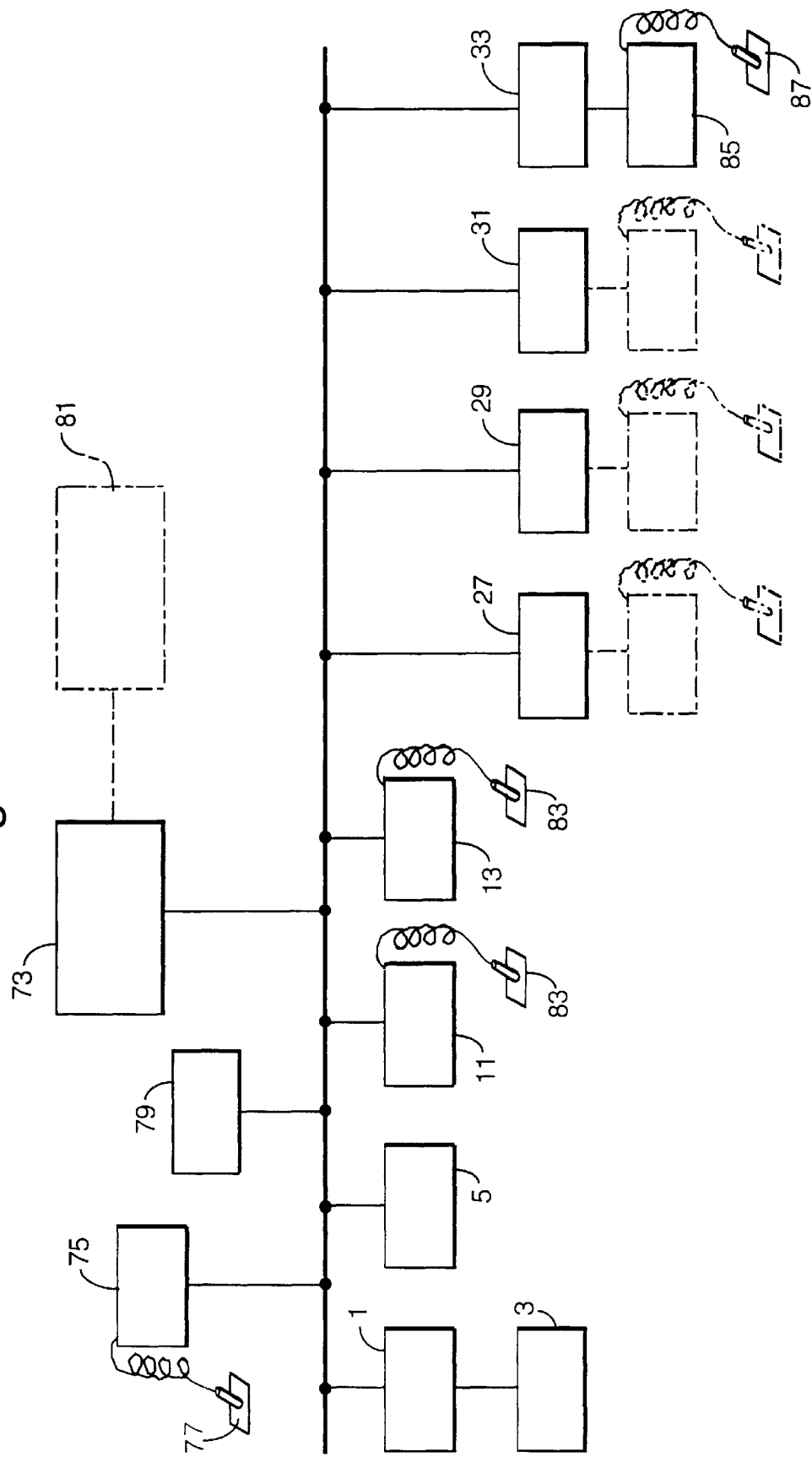
FIG. 7 shows a schematic embodiment of a communication device for use with the system of FIG. 1.

FIG. 7 shows a schematic embodiment of a communication device for use with the system of FIG. 1. A processor unit 73, which suitably can be in the form of a commercially available personal computer is connected through the communication device, hereinafter referred as a network, with a number of individual manufacturing facilities. In the present embodiment, the processor unit is coupled to an additional operator panel 75, which may be equipped with a data reader 77 shown in the form of a bar code reader pen. Another suitable data reader could be in the form of a scanner. The additional operator panel 75 could be required if control over the system is necessary from a location remote from where the processor unit 73 is located.

Further facilities may include a printer 79 and an (optional) external connection 81 by means of a modem connection. The external connection may provide direct access for clients, who, for example, can directly add any order to an order portfolio in the processor unit.

The printer 79 in the present embodiment is a bar-code printer for printing data carriers, such as stickers. Stickers issued from the printer 79 could be attached to a blind under construction for subsequent recognition or subsequent parameter retrieval. Any sticker is accordingly provided with a unique identification code.

The network further establishes communication with the rail machine 1, at least one string tape preparation machine 5, preferably two or more slat manufacturing and assembly machines 11 and 13, and any suitable number of end assembly stations 27, 29, 31, and 33.

The headrail fitting unit 3 in the described embodiment communicates via the rail machine 1. If the headrail fitting unit 3 were to operate in a stand-alone environment then it could have its own communication device or channel to the network to obtain the necessary input about the position and type of cord lock. The slat manufacturing and assembly machines 11 and 13 are each provided with a data input device, which is illustrated in the form of a bar code reader 83. Since a blind under construction may during manufacturing be appointed to one of a number of identical production units, the processor unit should be kept informed of the whereabouts of any particular blind under construction. In the present embodiment this is achieved by means of the bar-code stickers, but also automatic tracking techniques could be employed.

Once such a blind arrives at one of the slat manufacturing and assembly machines 11 or 13, this can be reported by scanning the unique identification code from the bar-code sticker attached to the headrail. Although upon receipt of this information by the processor unit 73 this in turn will provide the required parameters for further production while adjusting a status report on the order in question and its location.

If at least two slat machines are provided also a physical separation may be practical in that one machine produces exclusively bunches of 16 mm width slats and the other only those of 25 mm wide. The routing of blind orders will then be predefined.

Similar options are available if several string tape machines 5 are employed.

Four end assembly stations 27, 29, 31, and 33 are shown, which in the described embodiment are physically separated by carrying out different functions. Because a blind under construction then progresses sequentially from one station to the next one, only the last station 33 needs to be equipped with an operator panel 85, which again can be provided with or in the form of a bar code reader 87.

It is also possible that a blind under construction progressing towards the end assembly stations is redirected to a single one of these stations. In such a layout, each end assembly station 27, 29, 31, or 33 is adapted to finish the end assembly completely, and hence each of these stations then must be equipped with an operator input device as is shown in dash-dotted lines in FIG. 7.

An individual blind order is comprised of at least the following information:
a) type of the blind, i.e., whether 16 mm or 25 mm width slats are specified;
b) finish of the slat material; this can be a choice of up to hundred or more colors, perforated slats, patterned slats, or edge contoured slats;
c) position of the blind controls, left and right, or combined only left or only right; and
d) width and height of the finished blind or the dimensions of the area to be covered thereby.

These are only the most prominent parameters and even a few more may be encountered in blind orders. One example of an additional parameter is the specification of side guiding, which requires additional cut-outs to be made to the headrail, bottom rail, and slats. Side guiding in blinds, when regularly specified, may require an additional end assembly station to improve efficiency. The above cited parameters cannot be used directly by the individual manufacturing units.

Height and width dimensions, before being translated into the length and number of slats or the length of head and bottom profiles, require suitable adaptation for adequate clearance. Also, the maximum area of the blind is subject to certain restrictions and also governs the number of string tapes, lift cords, and hardware components to be used.

The choice of slats largely exceeds the available finishes of head and bottom rail stock and also the color range of cording. Hence a number of different slats finishes is combined with the same matching head and bottom rail finishes. The available shades of cording such as string tapes and lift cords are usually even fewer than those of the headrails. These variable parameters are manufacturer specified and accord with predefined rules, which should be incorporated in the processor unit. After appropriate processing of the customer orders each individual manufacturing unit is preferably fed with only those parameters necessary for its operation.

Figure 8:
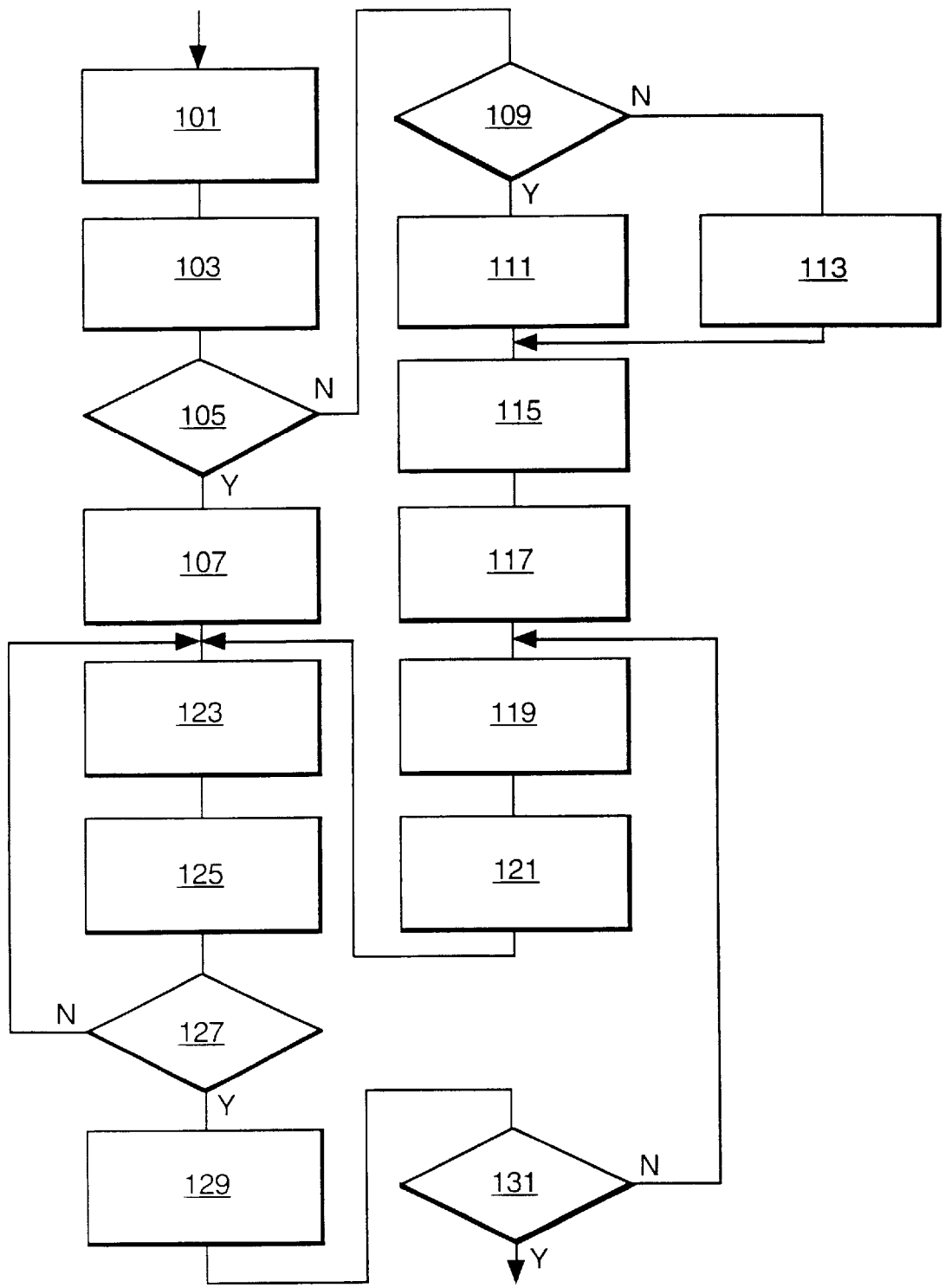
FIG. 8 shows an example of a flow chart for a processor unit to sort and optimize an order portfolio.

FIG. 8 shows an example of a flow chart for a processor unit to sort and optimize an order portfolio. A flow chart legend is given in Table 2 at the end of this description. Orders for blinds are stored in a database part of the processor unit and represent an order portfolio. The order portfolio may optionally be sorted, for example, according to date, priority index (if present), and slat finish. This being indicated as step 101 in FIG. 8. In the present example the priority index ranges from "0" (zero) to "2" (two), whereby the latter represents the highest priority. Slat finishes can comprise different colors, printed slat surfaces, embossed, perforated, or otherwise patterned slats as well as edge contoured slats from a choice of different edge contours.

The described embodiment starts with manufacturing of the head and bottom rails of a blind under construction, which manufacturing is executed by the rail machine. However, it is emphasized that production could equally well start with the manufacture of the required slats.

As said, with the described choice of slat finishes it is not usual to offer a similar large selection of headrail finishes. Hence, it suffices that there is available a matching head and bottom rail finish which blends well with a number of slat options. In the present embodiment, therefore, several individual slat finishes are grouped and attributed to a smaller number of available head and bottom rail finishes. This step can be contained in step 103.

The system then determines in step 105 and step 109 whether a priority index other then "0" should be attributed to the order. Since it may be desirable of attributing priority indexes while putting in orders, the system should only be enabled to adjust existing priority indexes to a higher value only. Orders older than a first period of (by way of example) one to several days as predefined in the system will automatically be increased to a priority value of "1" (step 11). Orders older than a predefined second period of (by way of example) several days to one week will be increased to a priority index of "2" (step 107). The value "0" will be retained if no particular priority is indicated (step 113). A priority index of "1" results in that the order is executed immediately after the current finish. Also the order with priority index "1" will possibly be executed first amongst other orders of the same finish. When there are several orders with a priority index of "1", but of different finishes, then all these priority "1" index finishes are planned before any other finish. For the sequence of several finishes with the priority "1" one may simply choose the sequence of the finish reference number or the sequence of receipt or acceptance. A production order having a priority index of "2" will be executed immediately next, irrespective of headrail length or finish. In case there are several priority "2" type orders, these will be dealt with strictly in their order of acceptance. For the priority "1" and "0" the manufacturing sequence is optimized within a particular finish to reduce as much as possible the amount of scrap. The scrap problem is particularly apparent in the production of head and bottom rails, which are formed from fixed commercial lengths of profiles measuring five to six meters in length. Uncut remaining lengths of less than about one meter are more often than not scrapped because their number easily exceeds the number of headrails required in this small size. Since head and bottom rail profiles are preshaped and prepainted, any scrap represents a substantial capital loss. For transportation purposes the commercial length has to be reduced to five or six meters whereas the economical manufacture of these profiles is confined to large volume factories which therefore need to distribute these profiles to several blind manufacturing workshops.

For optimization, the system determines in step 115 the matching headrail finish and individual lengths of head and bottom rail for the available order portfolio. The system then in step 117 sorts the required headrail lengths according to priority index, finish, and length. The next step 119 is to select the headrail finish that is next in turn for production and to optimize combinations of individually required headrail lengths. This step also takes into account the usual or average cutting loss. Parameters such as commercial length, remaining uncut or partially cut lengths, and cutting loss can be predefined in a data memory of the processor unit. In step 121, the production sequence for the particular finish is determined from the optimum combination found in step 119. The problem to be solved by optimization, an example of an optimization algorithm will be described hereafter, can also be represented as a traveler who is allowed only to take as luggage along a total weight of goods. If the goods to be selected from exceed the maximum allowed weight and each have different weights and values, the traveler will like to carry with him the largest possible value in goods. A suitable algorithm for such a problem can be a back-tracking algorithm of the so-called "knapsack" or "branch and bound" type. A similar algorithm can be used for the optimization in step 119, in which the maximum weight restriction would be represented by the available length of profile. The individual headrail lengths to be cut from the profile length would thereby be represented as the goods to be selected from. The "value" and "weight" of these lengths of headrail are identical in that the possible greatest length of headrail to be cut results in lesser scrap, but at the same time can never exceed the available length of profile while also allowing for cutting losses. Using the algorithm in this manner ensures that the available length of profile is used to the fullest possible extent while reducing scrap as much as possible.

The system following optimization for the next in turn finish of headrail selects in step 123 the uncut length of profile to be started from and starts production of the first headrail, bottom rail, and tilt rod. This is accomplished by the rail machine 1 and fitting unit 3, which have been described in connection with FIGS. 1 through 6.

Prior to and following each individual manufacturing step there may be communication which the processor unit, either to obtain parameters for production and/or to update and amend the order status of a blind under construction. This activity is illustrated as step 125 in FIG. 8. If the order is determined in step 127 not to be the last one for the current finish, then steps 123 and 125 are repeated. After the last order for the current finish has been completed there is an optional step to enable input of remaining uncut lengths of profile or any partial commercial lengths of profile for use in a future optimization for these remnants. This information can then be incorporated in the same finish.

If further finishes have to be run following the just completed finish, then the process is continued from step 119. After all orders for all finishes have been completed, the head and bottom rail manufacture will be interrupted until a new order portfolio is available. Further finishing of blinds under construction may then be still under way at the slat machines or finishing stations.

Reduction to practice has required that certain adaptations be made to the adopted algorithm. The number of commercial lengths of profile required for a number of blinds using the same finish is often more than one. Also the predefined priority index interferes with the ideal optimization criteria. For this reason it has been found that the following adaptations give improved results.

A) All blinds that have a headrail length in excess of half a commercial length of profile will require a fresh commercial length. For this reason the blind orders that include headrail lengths in this category are given an increased value index, which could simply be a double value. This substantially reduces calculation time of the algorithm, because part of the optimal solution can already be arrived at much earlier during the optimization calculations.

B) Ideally, the smaller lengths of headrail should be distributed over a possibly large number of successive commercial lengths. This enhances the available options of cutting each commercial length of profile with as little scrap as possible. Since the algorithm concentrates on a single commercial length at the time, it may reduce the amount of scrap in one commercial length at the cost of increased scrap in subsequent commercial lengths. This problem has been countered by setting a further condition by a maximum number of blind headrails that may be cut from a single commercial length. The maximum number of blinds to be cut from each commercial length of headrail is restricted by the following calculation:

$$n_{max} = \frac{n \times L}{\Sigma|n}$$

wherein:

$n_{max}$ = maximum number of blinds per commercial length of profile, $n$ = number of blinds per finish (this can be prefixed between ten and one hundred for efficiency reasons discussed below), $|n$ = individual headrail lengths, and $L$ = commercial length of profile (usually five to six meters).

The value of $N_{max}$ is to be adjusted to the next higher or lower integer value. A result of $N_{max}$ =2.5 blinds would typically result in either 2 or 3 blinds per commercial length or profile. This can be predefined to be only one of these values, but checking either of the adjacent values is also possible.

C) It has also been found that the number of blind orders of one finish to be optimized can result in a significant increase of the optimization calculation time. A point where the calculation time increases unduly without any noticeable further reduction in scrap will be reached between 10 and 100 blind orders in a single optimization step. Relief has been found in treating a large number of orders for a single finish effectively as two or more different finishes. The added calculation times of such subsequent optimizations are still less than the large single optimization with essentially the same result in scrap reduction. The limiting number for division of single finish orders can be set as a predefined parameter. Good results have been obtained with a break-even point of 30 blind orders.

D) A priority index "1" order is dealt with by increasing the value index thereof.

Analogous to paragraph A), a doubling of the value index could be chosen.

E) The priority index "2" orders are excluded from the optimization and are only subject to a sorting action within the order portfolio.

If partial commercial lengths of profile have been memorized from previous production runs, then these remnants are used in preference of fresh commercial lengths.

Figure 9:
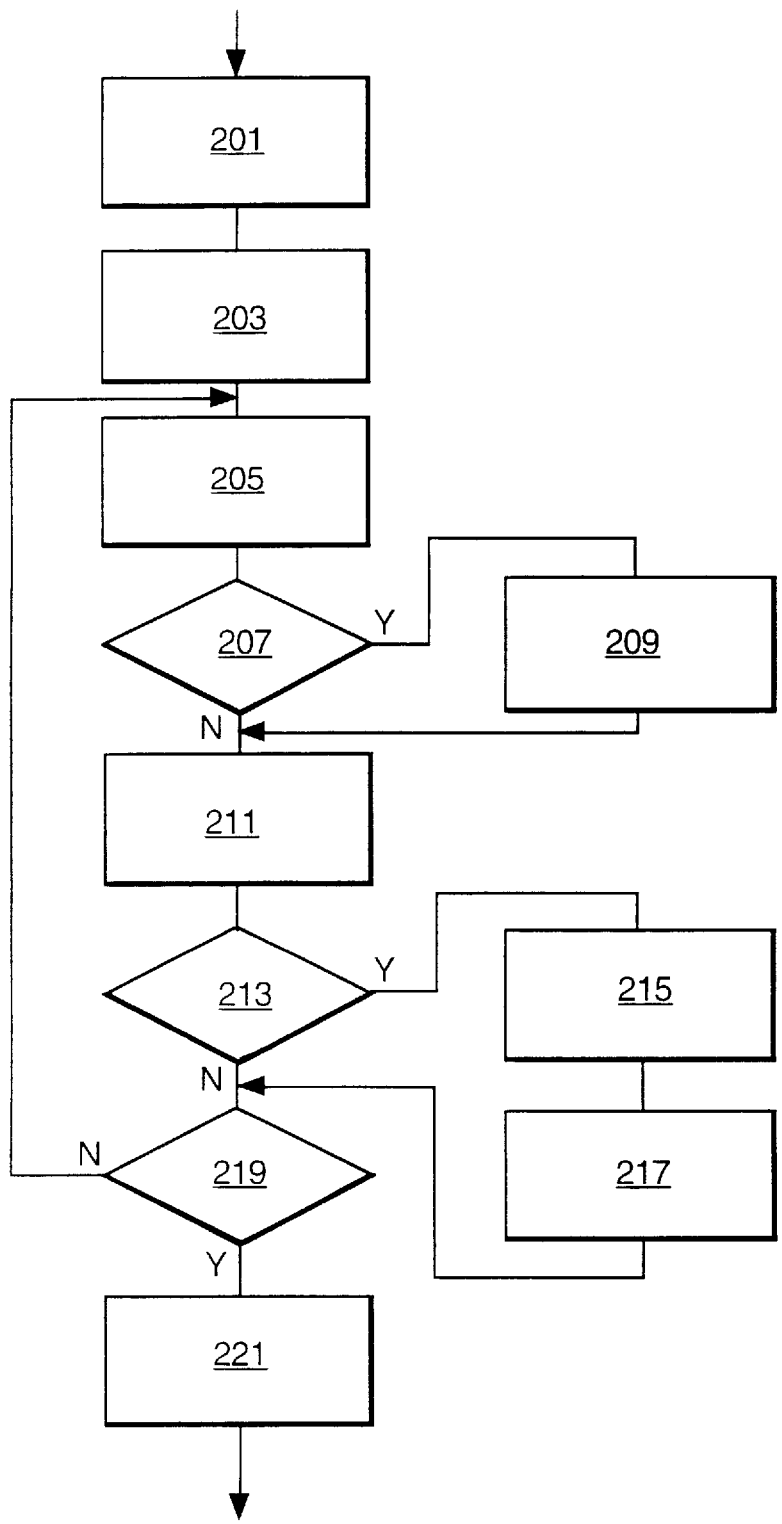
FIG. 9 shows an example of a flow chart illustrating an optimization algorithm for ranking an order portfolio.

FIG. 9 shows an example of a flow chart illustrating an optimization algorithm for ranking an order portfolio. A flow chart legend is given in Table 3 at the end of this description. The present chart represents a more elaborate version of the steps 119 and 121 of FIG. 8.

The system starts in step 201 with the selection of a next in turn finish of head and bottom rail production. Apart from the length of the headrail a value index has been created to give increased value to blinds that have higher priority or a length that exceeds more than half of a fresh commercial length.

This has been explained under paragraphs A) and D) above. The values are totalled during the optimization, but are reset to zero in step 203 at the beginning of an optimization for every new finish. In step 205 a possible combination is generated. Following step 207, which determines whether or not the value index should be increased, the value index is adjusted in step 209 if necessary.

Now, the total value of the generated combination is calculated in step 211. In step 213 the calculated value is compared with the set value, which is zero at the beginning. If a higher value is obtained, this is saved in step 217 together with the combination from which it results. Any previously saved lower value and (inferior) combination is thereby deleted.

The above process is repeated until the final generated combination is determined in step 219. The combination resulting in the highest value having been saved now allows step 221 to determine the production sequence, pertaining to this optimum. The further control is again as described in connection with FIG. 8 (step 123) and the flow chart of FIG. 9 is resumed once step 131 has determined that there are further orders in the portfolio.

Thus is described a system and procedure for the manufacturing of venetian blinds made to customers specification.

A common control device communicates with several automatic facilities that carry out individual stages of the blinds assembling. Data is communicated and exchanged between the common control device and the individual manufacturing facilities, such as rail machines, assembly units, slat machines, and finishing stations. Manufacturing thereby can be carried out more efficiently resulting in a more economical use of rail and slat stock. Use of rail stock in particular is optimized in view of colors and sizes with only reduced and controlled possibilities for interference in the optimum production sequence. Controlled interaction between the subsequent manufacturing facilities has thereby resulted in a significant reduction in time and scrap.

The invention is not limited to the above-mentioned embodiments. Within the scope of the invention, a man ordinary skilled in the art may generate some further concepts. Also the invention may be applied on systems for manufacturing other types of blinds.

TABLE 1

FIG. 6 legend

| Step | Description |
|---|---|
| 151 | Start |
| 153 | Sensor A = 1? |
| 155 | Start and continue feed counter |
| 157 | Reset feed counter |
| 159 | Sensor B = 1? |
| 161 | Sensor D = 1? |
| 163 | Sensor C = 1? |
| 165 | Sensor D = 1? |
| 167 | N = N + 1 |
| 169 | Calculate and set feed counter value for $(n + 1)^{th}$ operation of support inserting station (45) |
| 171 | Reset N = 0 |
| 173 | Feed counter value below predefined threshold value? |
| 175 | Cord lock in left hand position? |
| 177 | Calculate and set feed counter value for operation of left hand combined cord lock tilter inserting station (41) |
| 179 | Calculate and set feed counter value for operation of right hand combined cord lock tilter inserting station (43) |
| 181 | Feed counter value below predefined threshold value? |
| 183 | Feed counter value below predefined threshold value? |
| 185 | Calculate and set feed counter value for operation of left hand cord lock inserting station (37) |
| 187 | Calculate and set feed counter value for operation of tilter inserting station (34) |
| 189 | Calculate and set feed counter value for operation of right hand cord lock inserting station (39) |

TABLE 2

FIG. 8 legend

| Step | Description |
|---|---|
| 101 | Sort orders according to their date and slat finish (color, contour, pattern, shape, etc.); this step is optional. |
| 103 | Read available orders from database file. |
| 105 | Order date more than one week old. |

TABLE 2-continued

FIG. 8 legend

| Step | Description |
|---|---|
| 107 | Set priority index to "2". |
| 109 | Order date more than one day old. |
| 111 | Set priority index to "1". |
| 113 | Set priority index to "0". |
| 115 | Determine headrail finish matching the specified slat finish. |
| 117 | Sort according to priority index and according to matching headrail finish. |
| 119 | Select next in turn headrail finish for production, and optimize combinations of individually required headrail lengths against available uncut profile lengths. |
| 121 | Determine production sequence from optimum combination. |
| 123 | Select uncut profile length and start production of next in turn order for current finish. |
| 125 | Communicate with database file, execute production step and update database file with an amended status of the order. |
| 127 | Last order for current finish. |
| 129 | Input of remaining uncut profile lengths of the just completed finish for future retrieval; this step is optional. |
| 131 | Last order for all finishes of order portfolio. |

TABLE 3

FIG. 9 legend

| Step | Description |
|---|---|
| 201 | Select next in turn finish for production. |
| 203 | Set total value to zero |
| 205 | Generate a possible combination of required headrail lengths and available uncut lengths of profile. |
| 207 | Length of headrail is longer than half the length of the uncut profile or priority index is "1". |
| 209 | Increase the value index associated with this particular length of headrail. |
| 211 | Calculate total value of the generated combination. |
| 213 | Calculated total value is larger than the set total value. |
| 215 | Delete the set value and if applicable, delete any saved combination. |
| 217 | Set the total value to the newly calculated higher amount and save the superior combination of individual lengths associated therewith. |
| 219 | Last possible combination within the selected finish. |
| 221 | Determine sequence of production from lastly saved combination which represents the optimum combination. |

We claim:

1. System for manufacturing blinds, said system comprising a processor unit, at least one manufacturing facility for carrying out a manufacturing step and a communication device for exchanging data between the processor unit and said at least one manufacturing facility, characterized in that the processor unit is adapted to generate data for controlling the system taking into account an order portfolio and at least one parameter from said at least one manufacturing facility.

2. System according to claim 1, characterized in that the processor unit is adapted to sort the order portfolio.

3. System according to claim 1 or 2, characterized in that the processor unit is adapted to optimize the sequence of the order portfolio.

4. System according to claim 3, characterized in that the processor unit is adapted to sort individual orders for blinds from the order portfolio subject to dimension and finish of said orders, while optimizing same by ranking in accordance with said at least one parameter.

5. System according to claim 4, characterized in that the processor unit is adapted to generate unique identification codes relating to orders for blinds in the order portfolio.

6. System according to claim 5, characterized in that said at least one manufacturing facility comprises means for conveying each unique identification code to a data carrier associated with a particular blind under construction by said at least one manufacturing facility.

7. System according to claim 6, characterized in that the manufacturing step of said at least one manufacturing facility comprises cutting to length of an elongate material, whereby said at least one parameter relates to a specification of the elongate material.

8. System according to claim 7, characterized in that said specification comprises at least one of those relating to color and length of said elongate material.

9. System according to claim 7, characterized in that the elongate material comprises a rail profile.

10. System according to claim 9, characterized in that said at least one manufacturing facility is a headrail machine.

11. System according to claim 10, characterized in that the system further comprises a transport facility.

12. System according to claim 11, characterized in that the transport facility comprises a conveyor, which is provided with a number of carriers being longitudinally as well as transversely transportable.

13. System according to claim 12, characterized in that the system further comprises at least one further manufacturing facility for carrying out an additional manufacturing step, said at least one further manufacturing facility being coupled to the processor unit by the communication device.

14. System according to claim 13, characterized in that said at least one further manufacturing facility is a headrail fitting unit.

15. System according to claim 13, characterized in that the processor unit is adapted to take into account at least one further parameter from said at least one further manufacturing facility.

16. System according to claim 15, characterized in that said data generated by the processor unit is capable of controlling said at least one further manufacturing facility.

17. System according to claim 16 characterized in that said at least one further manufacturing facility is a slat manufacturing and assembling machine.

18. System according to claim 17, characterized in that said at least one parameter contains status information about a particular blind product under construction.

19. System according to claim 18, characterized in that said at least one parameter contains identification information about said at least one manufacturing facility.

20. System according to claim 19, characterized in that said at least one parameter contains status information about said at least one manufacturing facility.

21. System according to claim 20, characterized in that the communication device comprises a communication channel.

22. System according to claim 21, characterized in that the communication device comprises a human interface.

23. System according claim 22, characterized in that the communication device comprises a bar code reader.

24. System according to claim 23, characterized in that the communication device comprises a bar code printer.

25. System according to claim 1 or 2, characterized in that the processor unit is adapted to generate unique identification codes relating to orders for blinds in the order portfolio.

26. System according to claim 25, characterized in that said at least one manufacturing facility comprises means for conveying each unique identification code to a data carrier associated with a particular blind under construction by said at least one manufacturing facility.

27. System according to claim 1, characterized in that the manufacturing step of said at least one manufacturing facility comprises cutting to length of an elongate material, whereby said at least one parameter relates to a specification of the elongate material.

28. System according to claim 27, characterized in that said specification comprises at least one of those relating to color and length of said elongate material.

29. System according to claim 27, characterized in that the elongate material comprises a rail profile.

30. System according to claim 1, characterized in that said at least one manufacturing facility is a headrail machine.

31. System according to claim 1, characterized in that the system further comprises a transport facility.

32. System according to claim 31, characterized in that the transport facility comprises a conveyor, which is provided with a number of carriers being longitudinally as well as transversely transportable.

33. System according to claim 1, characterized in that the system further comprises at least one further manufacturing facility for carrying out an additional manufacturing step, said at least one further manufacturing facility being coupled to the processor unit by the communication device.

34. System according to claim 33, characterized in that the processor unit is adapted to take into account at least one further parameter from said at least one further manufacturing facility.

35. System according to claim 33 or 34, characterized in that said data generated by the processor unit is capable of controlling said at least one further manufacturing facility.

36. System according to claim 35 characterized in that said at least one further manufacturing facility is a slat manufacturing and assembling machine.

37. System according to claim 33 or 34, characterized in that said at least one further manufacturing facility is a slat manufacturing and assembling machine.

38. System according to claim 33, characterized in that said at least one further manufacturing facility is a headrail fitting unit.

39. System according to claim 1, characterized in that said at least one parameter contains status information about a particular blind product under construction.

40. System according to claim 1, characterized in that said at least one parameter contains identification information about said at least one manufacturing facility.

41. System according to claim 1, characterized in that said at least one parameter contains status information about said at least one manufacturing facility.

42. System according to claim 1, characterized in that the communication device comprises a communication channel.

43. System according to claim 1, characterized in that the communication device comprises a human interface.

44. System according to claim 1, characterized in that the communication device comprises a bar code reader.

45. System according to claim 1, characterized in that the communication device comprises a bar code printer.

46. A system for manufacturing blinds, the system comprising:

a processor unit adapted to generate data for controlling the system taking into account an order portfolio, said processor unit also being adapted to generate unique identification codes relating to orders for blinds in the order portfolio, a communication device comprising a communication channel, a human interface, a bar code reader, and a bar code printer, a headrail machine being coupled to said processor unit by said communication device, said headrail machine being adapted to cut to length an elongate material comprising a rail profile, and said headrail machine being capable of generating at least one parameter that said processor unit is adapted to take into account when controlling the system, a headrail fitting unit, said headrail fitting unit being coupled to said processor unit by said communication device, and said headrail fitting unit being capable of generating at least one parameter that said processor unit is adapted to take into account when controlling the system, a slat manufacturing and assembling machine, said slat manufacturing and assembling machine being coupled to said processor unit by said communication device, and said slat manufacturing and assembling machine being capable of generating at least one parameter that said processor unit is adapted to take into account when controlling the system, a transport facility comprising a conveyor, which is provided with a number of carriers being longitudinally as well as transversely transportable, said transport facility being operably associated with said headrail machine, said headrail fitting unit, and said slat manufacturing and assembling machine, and a means for conveying each said unique identification code to a data carrier associated with a particular blind under construction by said system.

* * * * *